Patented Jan. 12, 1932

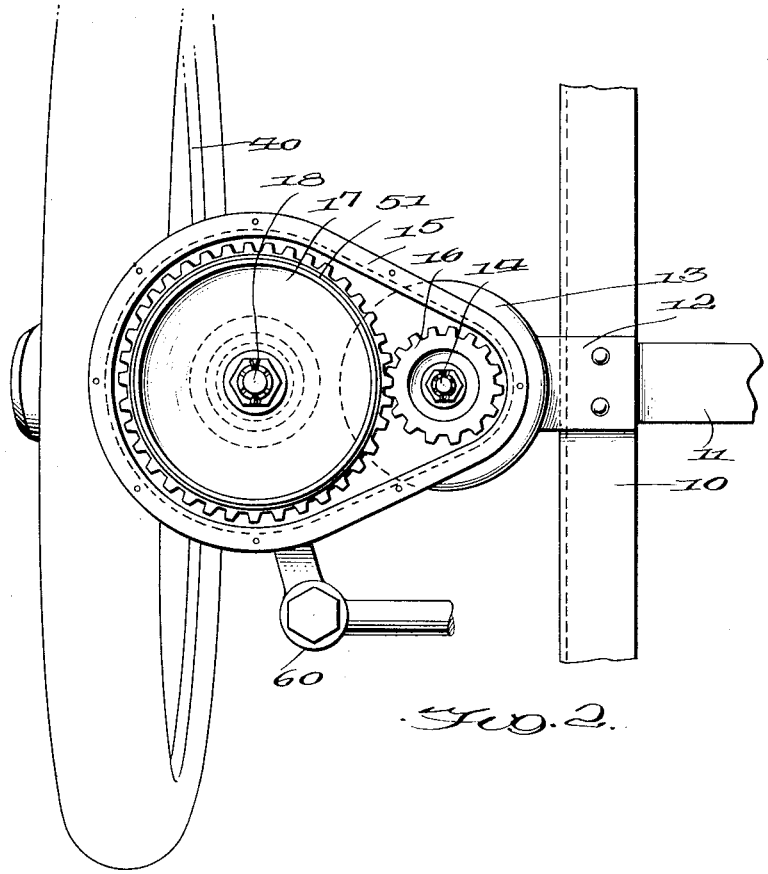
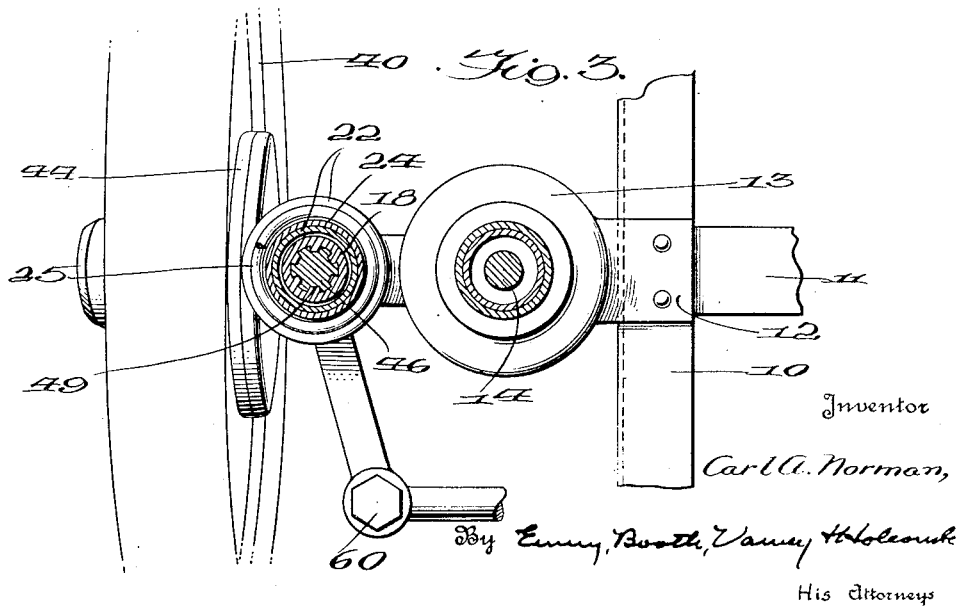

1,840,407

UNITED STATES PATENT OFFICE

CARL A. NORMAN, OF COLUMBUS, OHIO

ELECTROMECHANICAL WHEEL DRIVE

Application filed June 12, 1930, Serial No. 460,784. Renewed November 17, 1931.

This invention relates to the electro-mechanical driving of vehicle wheels and the like and aims generally to improve the same.

Among the more important objects of my invention are, singly and interdependently, improved means enabling the electro-mechanical driving of vehicle wheels with a minimum unsprung weight, i. e. weight borne directly by the wheel axles; improved means providing for vertical wheel movement relative to the driving motor, which is substantially rigid with the vehicle chassis; improved means for driving the wheel while permitting varying the angular position of the driven wheel axis, as in steering; improved means embodied in the wheel mounting for the absorption of road-shock; an improved arrangement of electro-mechanical wheel drive to increase the wheel adhesion without increase of the unsprung weight, and the simplification and improvement of the details of electro-mechanical wheel drives, particularly adapted for the driving of the front or steering wheels, to improve the operation and efficiency thereof while contributing to cheapness of manufacture and low cost of maintenance thereof.

Further objects and advantages of my invention will be apparent from the following detailed description of a preferred embodiment incorporating and illustrating the same; and by the above enumeration of such objects and advantages of my invention as I now consider to be of importance, I do not intend to exclude such further inherent advantages thereof as are not particularly pointed out above.

In the drawings illustrating a preferred embodiment of my invention:

Fig. 2 is a horizontal section taken at line 2—2 of Fig. 1, looking down; and

Fig. 3 is a horizontal section taken at line 3—3 of Fig. 1, also looking down.

Figure 1:
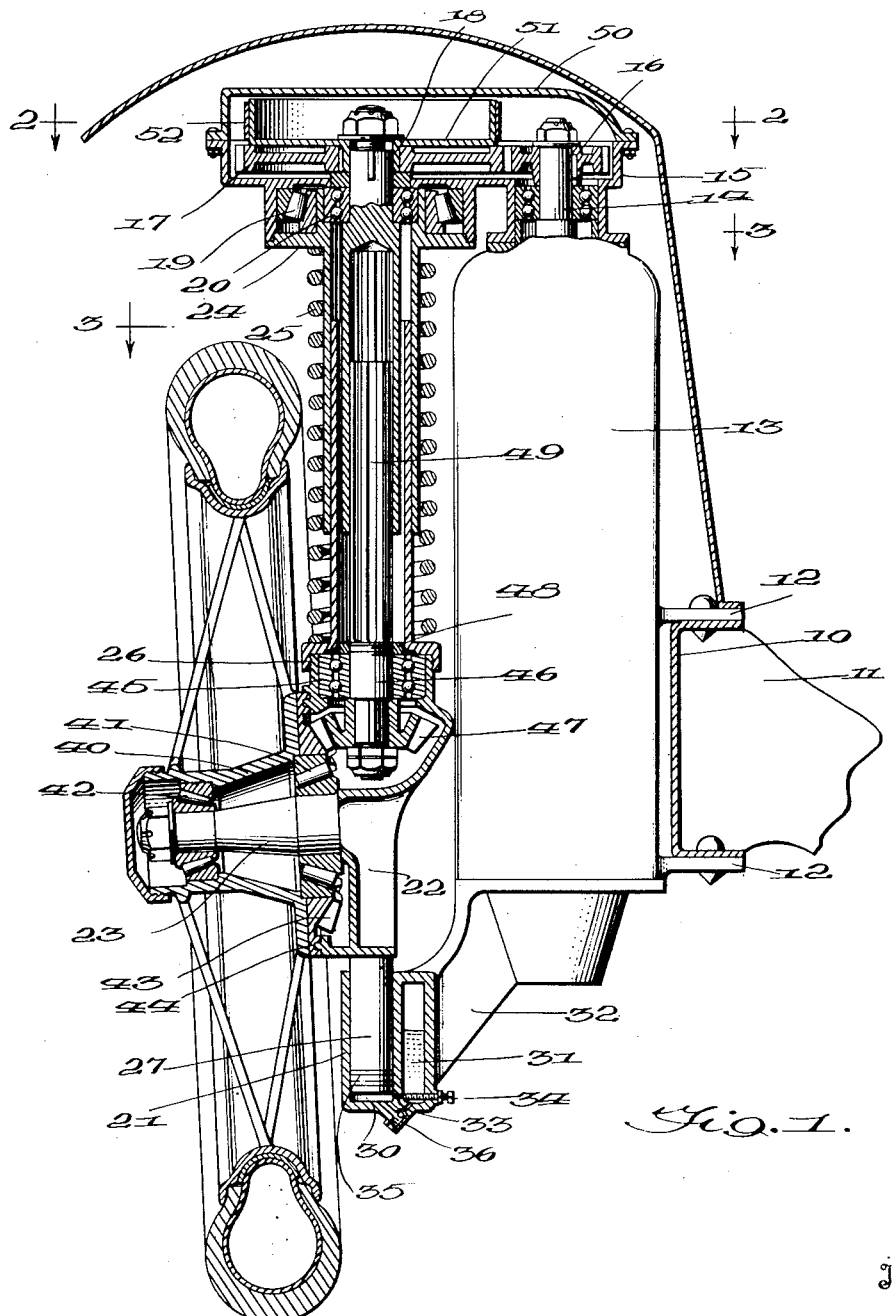
Fig. 1 is a part elevation and part central cross section of a vehicle wheel and my improved mounting and drive therefor, connected to a vehicle frame and largely shown in section.

Referring to the drawings, the device illustrated therein comprises a motor, a wheel and interconnecting driving means assembled as a unit and attached to any suitable part of the vehicle chassis, such as the side member or frame 10 adjacent to the transverse member or axle 11, by means of suitable ears or lugs 12, riveted or otherwise secured thereto.

The frame of the unit comprises all the encasing and supporting parts which are rigidly connected to the chassis 10—11 as by the ears or lugs 12, and carries an electric motor, the armature of which is connected in any suitable way to drive the wheel while permitting vertical movement of the wheel and the spindle by which it is carried.

In the embodiment shown, the motor 13 is arranged vertically with its armature shaft 14 extending upwardly into a housing 15. Within the housing 15 a pinion 16 is attached to the shaft 14 in any suitable manner, as by the key, washer, nut and cotter pin arrangement shown, and this pinion 16 is engaged with a pinion 17 suitably made fast to a driving shaft 18, the pinions 16 and 17 constituting means for connecting the motor 13 to drive the shaft 18.

The driving shaft 18 is preferably concentrically arranged with respect to a primary bearing 19 constituting a radial and thrust bearing, adapted to receive, and transmit the load to, the wheel supporting assembly, and the driving shaft itself is journalled in a suitable bearing 20.

The primary bearing 19 and an aligning secondary sliding socket bearing 21 are carried by the unit frame, and in turn carry the wheel supporting assembly, the primary bearing carrying the major portion of the vertical load and the primary and secondary bearings serving to maintain the wheel and its spindle and associated parts in proper position.

In the embodiment shown, the primary bearing 19 is arranged uppermost with the secondary bearing 21 arranged in vertical alignment below the same, and the wheel supporting assembly is comprised of a telescoping casing made up of a spindle carrying portion 22, carrying the wheel spindle 23, and a thrust portion 24 engaged with the primary bearing 19. Interposed between the thrust portion 24 and the spindle carrying portion 22 is a heavy coiled spring 25 which serves to transmit the load due to the weight of the vehicle to the spindle and wheel in an elastic manner. In the embodiment shown, the spindle carrying portion 22 of the telescoping casing is made up of two parts threaded together at 26 to provide for ready assembly therein of the driving means interconnecting the drive shaft 18 and the wheel 40.

The spindle carrying portion 22 of the wheel supporting assembly is provided with a pivot 27 which engages with the secondary sliding socket bearing 21, and in the embodiment shown this pivot 27 is capable of longitudinal movement with respect to the secondary bearing 21 to provide for vertical movement of the entire spindle carrying portion 22 against the resilient resistance of the spring 25, with respect to the frame of the unit.

The wheel supporting structure thus provided is particularly adapted for the application of shock absorbing means to the spindle carrying portion 22, and in the embodiment shown I have incorporated an illustrative shock absorbing means in the unitary structure of the device. This shock absorbing device is preferably formed according to my invention by extending the secondary sliding socket bearing 21 and closing the end of the same to provide a chamber 30 below the pivot 27, and which communicates by means of an opening 33, capable of being varied in effective size of the needle valve 34, with an oil and air chamber 31 formed in the arm 32, by which the socket bearing is supported from the main body of the frame. The pivot pin 27 is provided with sealing rings 35 and serves as a shock absorber plunger. It is desirable to provide an auxiliary check-valved passage 36 between the chambers 30 and 31 to provide for lesser resistance to upward movement of the spindle carrying portion 22 than to the downward movement thereof, this provision being particularly advantageous in connection with my device due to the fact that upward movement of the wheel relative to the frame is opposed by the spring 25, which assists the downward movement of the wheel.

The vehicle wheel 40 is mounted on the spindle 23 in the ordinary manner, by means of tapered roller bearings 41 and 42 and the usual washer, nut and cotter pin shown, or any other suitable means. On the inner face of the wheel 40 and concentric with the axis thereof are mounted a bevel ring gear 43, extending into the spindle carrying portion of the telescoping casing as shown, and a lubricant sealing member 44 which in the form shown comprises a flat ring provided with a grooved face adapted to cooperate with a grooved ring carried by the casing 22 to present a tortuous passageway from the interior to the exterior of the assembly to prevent the escape of lubricant at this point. These two elements may conveniently be made in a single unit, as shown.

Within the spindle carrying portion 22 of the casing, and clamped at 26 between the two sections thereof, I provide a suitable shaft bearing 45 in which is fastened a splined shaft 46, carrying a bevel gear 47 meshed with the ring gear 43. This shaft 46 is held in position in the bearing 45 by a suitable lock-collar 48 and has a splined or other suitable extensible connection with the driving shaft 18 as shown at 49, and constitutes with shaft 18 an extensible means providing for the driving of the wheel without mounting the motor directly thereon.

Thus, motor 13 drives the shaft 18 through gearing 16 and 17, and the shaft 18 through the splined or other suitable connection 49 drives the shaft 46 which, through gearing 47—43, rotates the wheel 40, carried by the spindle 23, while allowing the wheel 40, spindle 23, spindle carrying portion 22 of the telescoping casing, and drive elements 45, 46 and 47 to swing and move vertically with respect to the frame of the unit.

The housing 15 is provided with a cover plate 50 and I prefer to construct the housing and cover of sufficient depth, as shown, to provide for the enclosure therein of a brake drum 51 suitably keyed or otherwise attached to the shaft 18, and acted upon by a brake-band 52 suitably supported by and actuated through the cover plate 50, and comprising the standing brake, it being understood that the service-brake is to be applied to my unit in any suitable exterior position to provide for cooling of the same, as by its direct application to the wheel, or by extending the shaft 18 beyond the cover plate 50 and applying the conventional service brake thereto, the object in the latter case being to position the brake so that it will remain stationary relative to the chassis of the vehicle, instead of being vertically movable with the wheel. As the standing brake 51—52 is illustrative of this desirable advantage, I have considered it unnecessary to complicate the drawings by the showing of a second braking mechanism applied to the shaft 18 exterior of the housing 15—50.

As shown in Figs. 2 and 3 steering is effected by means of the steering arm 60, suitably connected to the spindle carrying portion 22 of the telescoping casing.

It will be appreciated that according to my construction the advantages of the electro-mechanical drive can be utilized in front wheel driven vehicles and four wheel or six wheel driven vehicles without increasing the unsprung weight on the wheels and without complicated equalizing gearing.

The motors 13 applied to the individual wheels of the vehicle are preferably supplied with current generated by an engine driven generator carried by the vehicle. The wheels are driven independently of each other so far as mechanical interconnection of drive is concerned, and accordingly no differential or equalizing gearing or mechanisms are required. Moreover, there are no horizontal drive shafts and no universal joints needed, as with the usual mechanical front wheel drive. The use of a separate motor for each wheel makes possible a series parallel electrical connection giving high starting torque at low speed and a capacity for high speed with lessened torque without changing the gearing or varying the ratio of motor to driven shaft speed.

In addition, my arrangement makes available for front wheel driven vehicles the advantages of the gasoline-electric drive which provides extreme ease of starting and flexibility of speed regulation.

From the mechanical standpoint a vehicle embodying my construction will have exceptionally good riding qualities and great "roadability" due to the fact that the position of the heavy electric motors increases the wheel adhesion and lowers the center of gravity of the vehicle while the unsprung weight consists practically of the wheels alone and is therefore reduced to a minimum. Moreover, the wheels are sprung entirely independently of one another, and this factor taken with the low ratio of unsprung weight makes for comfortable riding, while the increased wheel adhesion (a decided advantage with front wheel drives) and the lowered center of gravity, makes for greater safety and "roadability".

Having described what I consider to be a preferred embodiment of my invention I wish it to be understood that I do not restrict my invention to the details of my illustrative embodiment, but I claim as my invention:

1. In a unitary electro-mechanical wheel drive, a frame adapted to be secured to a vehicle chassis, an electric motor carried by said frame, a wheel assembly resiliently mounted in said frame and embodying a telescoping driving shaft, and means interconnecting said motor and driving shaft for driving the same.

2. A unitary electro-mechanical wheel drive comprising a frame, an electric motor carried thereby, pivot bearings carried by said frame, a wheel assembly embodying a telescoping driving shaft pivotally assembled in said bearings, and means connecting said motor and said driving shaft for driving the same.

3. An electro-mechanical wheel drive comprising a frame adapted to be rigidly secured to the chassis of a vehicle, a motor carried thereby, primary and secondary bearings carried thereby, said primary bearing comprising a radial and thrust bearing, a telescoping casing comprising a spindle carrying portion embodying a pivot member adapted for cooperation with said secondary bearing and a portion adapted to coact with said primary bearing, said secondary bearing permitting longitudinal movement of said pivot member, means resiliently resisting upward motion of said spindle carrying portion, a spindle carried by said spindle carrying portion, a wheel rotatably mounted on said spindle, driving means for said wheel comprising a driving shaft coaxial with said primary bearing, gearing connecting said driving shaft with said wheel, and drive elongating means to permit relative vertical movement of said spindle carrying portion and wheel, gearing connecting said motor with said driving shaft, a brake acting on said driving shaft, shock absorbing means coacting with said longitudinally movable pivot member, and an arm extending from said telescoping casing to provide for angularly positioning said wheel and spindle on the axis of said primary and secondary bearings for steering the vehicle.

4. An electro-mechanical wheel drive comprising a frame adapted to be rigidly secured to the chassis of a vehicle, a motor carried thereby, primary and secondary bearings carried thereby, said primary bearing comprising a radial and thrust bearing, a telescoping casing comprising a spindle carrying portion embodying a pivot member adapted for cooperation with said secondary bearing and a portion adapted to coact with said primary bearing, said secondary bearing permitting longitudinal movement of said pivot member, means resiliently resisting upward motion of said spindle carrying portion, a spindle carried by said spindle carrying portion, a wheel rotatably mounted on said spindle, driving means for said wheel comprising a driving shaft coaxial with said primary bearing, gearing connecting said driving shaft with said wheel, and drive elongating means to permit relative vertical movement of said spindle carrying portion and wheel, gearing connecting said motor with said driving shaft, shock absorbing means coacting with said longitudinally movable pivot member, and an arm extending from said telescoping casing to provide for angularly positioning said wheel and spindle on the axis of said primary and secondary bearings for steering the vehicle.

5. An electro-mechanical wheel drive comprising a frame adapted to be rigidly secured to the chassis of a vehicle, a motor carried thereby, primary and secondary bearings carried thereby, said primary bearing comprising a radial and thrust bearing, a telescoping casing comprising a spindle carrying portion embodying a pivot member adapted for cooperation with said secondary bearing and a portion adapted to coact with said primary bearing, said secondary bearing permitting longitudinal movement of said pivot member, means resiliently resisting upward motion of said spindle carrying portion, a spindle carried by said spindle carrying portion, a wheel rotatably mounted on said spindle, driving means for said wheel comprising a driving shaft coaxial with said primary bearing, gearing connecting said driving shaft with said wheel, and drive elongating means to permit relative vertical movement of said spindle carrying portion and wheel, gearing connecting said motor with said driving shaft, a brake acting on said driving shaft, and an arm extending from said telescoping casing to provide for angularly positioning said wheel and spindle on the axis of said primary and secondary bearings for steering the vehicle.

6. An electro-mechanical wheel drive comprising a frame adapted to be rigidly secured to the chassis of a vehicle, a motor carried thereby, primary and secondary bearings carried thereby, said primary bearing comprising a radial and thrust bearing, a telescoping casing comprising a spindle carrying portion embodying a pivot member adapted for cooperation with said secondary bearing and a portion adapted to coact with said primary bearing, said secondary bearing permitting longitudinal movement of said pivot member, means resiliently resisting upward motion of said spindle carrying portion, a spindle carried by said spindle carrying portion, a wheel rotatably mounted on said spindle, driving means for said wheel comprising a driving shaft coaxial with said primary bearing, gearing connecting said driving shaft with said wheel, and drive elongating means to permit relative vertical movement of said spindle carrying portion and wheel, gearing connecting said motor with said driving shaft, and an arm extending from said telescoping casing to provide for angularly positioning said wheel and spindle on the axis of said primary and secondary bearings for steering the vehicle.

7. An electro-mechanical wheel drive comprising a frame, a primary bearing and a secondary bearing carried thereby, a telescoping casing comprising a thrust portion mounted in said primary bearing and a spindle carrying portion movable relatively thereto and embodying a pivot mounted in, and rotatably and longitudinally movable with respect to, said secondary bearing, interposed resilient means between said thrust portion and said spindle carrying portion, a wheel rotatably mounted on said spindle carrying portion, a telescoping drive extending from said spindle carrying portion through said primary bearing and exteriorly of said telescoping casing, gearing connecting said drive to said wheel, a motor carried by said frame, and means connecting said motor to said drive exteriorly of said casing, substantially as and for the purpose described.

8. An electro-mechanical wheel drive comprising a frame, a motor carried by said frame, a primary thrust and radial bearing carried by said frame, a secondary radial bearing carried by said frame in alignment with said primary bearing, a telescoping casing comprising a portion seated in said primary bearing and a movable portion telescoping therewith and rotatable in, and longitudinally movable relative to, said secondary bearing, a compression spring separating said portions and adapted to transmit the load from said primary bearing to said movable portion, a spindle carried by said movable portion, a wheel carried by said spindle, and a telescoping drive shaft extending axially through said primary bearing, a driving connection to said shaft from said motor, and a driving connection from said shaft to said wheel.

9. In an electro-mechanical wheel drive, a frame, a motor carried thereby, a vertical telescoping drive shaft carried thereby, a driving connection from said motor to said shaft, a resiliently telescoping casing surrounding said drive shaft comprising a portion movable vertically relative to said frame, a bearing on said frame supporting said casing, a wheel carried by said vertically movable portion, and a driving connection from said drive shaft to said wheel.

10. In an electro-mechanical wheel drive, a frame, a motor carried thereby, a vertical telescoping drive shaft carried thereby, a driving connection from said motor to said shaft, a resiliently telescoping casing surrounding said drive shaft comprising a portion movable vertically relative to said frame, a bearing on said frame supporting said casing, a wheel carried by said vertically movable portion, a driving connection from said drive shaft to said wheel, and shock absorbing means connected to said movable portion.

11. An electro-mechanical wheel drive comprising a frame adapted to be rigidly secured to the chassis of a vehicle, a motor carried thereby, primary and secondary bearings carried thereby, said primary bearing comprising a radial and thrust bearing, a telescoping casing comprising a spindle carrying portion embodying a member adapted for cooperation with said secondary bearing and a portion adapted to coact with said primary bearing, said secondary bearing permitting longitudinal movement of said member, means resiliently resisting upward motion of said spindle carrying portion, a spindle carried by said spindle carrying portion, a wheel rotatably mounted on said spindle, driving means for said wheel comprising a driving shaft coaxial with said primary bearing, gearing connecting said driving shaft with said wheel, and drive elongating means to permit relative vertical movement of said spindle carrying portion and wheel, and gearing connecting said motor with said driving shaft.

12. An electro-mechanical wheel drive comprising a frame, a primary bearing and a secondary bearing carried thereby, a telescoping casing comprising a thrust portion mounted in said primary bearing and a spindle carrying portion movable relatively thereto and embodying a member mounted in, and longitudinally movable with respect to, said secondary bearing, interposed resilient means between said thrust portion and said spindle carrying portion, a wheel rotatably mounted on said spindle carrying portion, a telescoping drive extending from said spindle carrying portion through said primary bearing and exteriorly of said telescoping casing, gearing connecting said drive to said wheel, a motor carried by said frame, and means connecting said motor to said drive exteriorly of said casing.

13. The combination defined in claim 12, provided with shock absorber means embodying a plunger constituted by said member.

14. The combination defined in claim 12, provided with shock absorber means embodying a plunger constituted by said member and constructed for lesser resistance to upward movement of said spindle carrying portion than to downward movement thereof.

15. An electro-mechanical wheel drive comprising a frame, a motor carried by said frame, a primary thrust and radial bearing carried by said frame, a secondary radial bearing carried by said frame in alignment with said primary bearing, a telescoping casing comprising a portion seated in said primary bearing and a movable portion telescoping therewith and longitudinally movable relative to, said secondary bearing, a compression spring separating said portions and adapted to transmit the load from said primary bearing to said movable portion, a spindle carried by said movable portion, a wheel carried by said spindle, and a telescoping drive shaft extending axially through said primary bearing, a driving connection to said shaft from said motor, and a driving connection from said shaft to said wheel.

16. In an electro-mechanical wheel drive, a frame, a motor carried thereby, a vertical telescoping drive shaft carried thereby, a driving connection from said motor to said shaft, a resiliently telescoping casing surrounding said drive shaft comprising a portion movable vertically relative to said frame, a bearing on said frame rotatably supporting said casing, a wheel carried by said vertically movable portion, a driving connection from said drive shaft to said wheel and means for angularly positioning said wheels and casing by rotation in said bearings.

17. In an electro-mechanical wheel drive, a frame, a motor carried thereby, a vertical telescoping drive shaft carried thereby, a driving connection from said motor to said shaft, a resiliently telescoping casing surrounding said drive shaft comprising a portion movable vertically relative to said frame, a bearing on said frame rotatably supporting said casing, a wheel carried by said vertically movable portion, a driving connection from said drive shaft to said wheel, shock absorbing means connected to said movable portion and means for angularily positioning said wheel and casing by rotation in said bearings.

In testimony whereof, I have signed my name to this specification.

CARL A. NORMAN.